(12) United States Patent
Minter et al.

(10) Patent No.: US 9,784,025 B2
(45) Date of Patent: Oct. 10, 2017

(54) ADJUSTABLE OPERATOR WORM GEAR DRIVE WITH ROBUST BEARING SURFACES

(71) Applicant: Interlock USA, Inc., Reno, NV (US)

(72) Inventors: Peter J. Minter, Reno, NV (US); Marc W. Fullenwider, Reno, NV (US)

(73) Assignee: Interlock USA, Inc., Reno, NV (US)

( * ) Notice: Subject to any disclaimer, the term of this patent is extended or adjusted under 35 U.S.C. 154(b) by 165 days.

(21) Appl. No.: 14/149,000

(22) Filed: Jan. 7, 2014

(65) Prior Publication Data
US 2015/0191956 A1 Jul. 9, 2015

(51) Int. Cl.
E05F 11/34 (2006.01)
F16H 1/16 (2006.01)

(52) U.S. Cl.
CPC .............. E05F 11/34 (2013.01); F16H 1/16 (2013.01); Y10T 74/18792 (2015.01)

(58) Field of Classification Search
CPC ... F16H 1/16; E05F 11/16; E05F 11/24; E05F 11/34
See application file for complete search history.

(56) References Cited

U.S. PATENT DOCUMENTS

| | | | |
|---|---|---|---|
| 576,308 A * | 2/1897 | Habre | B26D 3/30 83/244 |
| 1,971,360 A | 8/1934 | Watson | |
| 2,926,905 A * | 3/1960 | Ahlgren | E05F 11/12 74/89.13 |
| 3,846,938 A * | 11/1974 | Kelly | E05F 11/34 49/342 |
| 4,860,493 A | 8/1989 | Lense | |
| 5,765,308 A * | 6/1998 | Anderson | E05F 11/16 49/342 |
| 6,122,863 A * | 9/2000 | Tippin | E05F 11/16 49/279 |
| 6,122,893 A * | 9/2000 | Weaver | B65B 17/025 53/201 |
| 6,385,911 B1 | 5/2002 | Anderson et al. | |
| 6,606,825 B2 * | 8/2003 | Lee | E05F 11/16 49/339 |
| 6,672,010 B1 | 1/2004 | Gledhill et al. | |
| 7,278,335 B2 | 10/2007 | Zhang | |
| 7,464,619 B2 * | 12/2008 | Vetter | E05F 11/16 384/125 |
| 7,614,184 B2 * | 11/2009 | Rebel | E05F 11/24 49/339 |

(Continued)

FOREIGN PATENT DOCUMENTS

GB 2283783 A 5/1995

Primary Examiner — Victor MacArthur
(74) Attorney, Agent, or Firm — DeLio, Peterson & Curcio, LLC; Robert Curcio

(57) ABSTRACT

A worm gear drive operator having immovable flat thrust bearing surfaces at each end of a worm gear drive for absorbing thrust forces and keeping direct mechanical rotational forces away from the cover plate and housing base during rotation of the worm gear drive. The worm gear drive operator assembly is capable of vertical adjustment of the actuator arm while providing thrust support. A threaded post about which rests a bearing for the actuator arm, and is secured in place by an adjustment screw received within a threaded post on the cover plate.

14 Claims, 9 Drawing Sheets

(56) References Cited

U.S. PATENT DOCUMENTS

| | | | |
|---|---|---|---|
| 8,141,295 B2* | 3/2012 | Carrier | E05F 11/16 49/246 |
| 2002/0078630 A1* | 6/2002 | Lee | E05F 11/16 49/342 |
| 2005/0016073 A1* | 1/2005 | Petta | E05C 9/02 49/504 |
| 2006/0144180 A1 | 7/2006 | Zhang | |
| 2006/0175846 A1* | 8/2006 | Rice | E05B 81/22 292/341.16 |
| 2010/0101148 A1* | 4/2010 | Carrier | E05F 11/16 49/346 |

* cited by examiner

ADJUSTABLE OPERATOR WORM GEAR DRIVE WITH ROBUST BEARING SURFACES

BACKGROUND OF THE INVENTION

1. Field of the Invention

This invention relates to casement window operators of the type in which a pivotally mounted window controlling lever is actuated by a crank or electric motor operated worm gear drive, and specifically to one having a more robust design for supporting thrust loads. More specifically, the worm gear drive operator is designed with thrust bearing components at each end of a worm gear drive to remove mechanical rotating surfaces from interaction with the housing base or cover plate, while absorbing the rotational thrust of the device. The invention further relates to a vertically adjustable actuator arm, where the adjustment may be made in-situ after installation utilizing a threaded post about which rests a bearing for the actuator arm on a hardened steel plate for thrust load support, and which is secured in place by an adjustment screw received within the threaded post.

2. Description of Related Art

A casement type window is a window that opens outward and is hinged along one side. A transparent windowpane is held in a framework, referred to as the casement window "sash," and the sash is hinged along one edge to a fixed window frame. Because a casement window swings outward, a screen for the window must be mounted on the inside.

Mounting the screen on the inside prevents the user from directly accessing the sash to open or close the window. Thus, casement windows are commonly provided with a mechanical device, referred to as a "casement window operator." The casement window operator is mounted at an accessible location on the inside of the window frame and functions to swing the sash open or closed without requiring the screen to be removed.

There are many different known designs for casement window operators; however, they generally all include a base mounted to the inside of the window frame, a handle mounted to the base and one or more operator arms that are driven by the handle. The driven arm or arms apply a force between the window frame and the window sash to swing the casement window sash between the open and closed positions.

Casement windows employ a sash that swings open and closed about an upright axis along one vertical edge of the sash, or sliding axis parallel to the sill and header. Operator assemblies for affecting that swinging motion have been available for many years in various forms. Generally, the casement window is opened and closed by a hand crank or electric motor. Casement window cranks usually consist of a handle, a spindle, and internal gears. Each time the handle or crank is operated via hand or electric motor, gears at the inner end of the spindle engage with larger gears that push or pull the actuator arm or crank arm that opens or closes the window.

The crank activates a worm drive that drives a worm gear which interacts with an actuator arm to push the window sash open. A worm drive is a gear arrangement in which a worm or gear in the form of a screw meshes a complementary gear structure on the actuator arm. Like other gear arrangements, a worm drive can reduce rotational speed or allow higher torque to be transmitted.

The worm gear is meshed with a gear segment which is part of the linkage assembly inclusive of an actuator arm that is connected to the sash. The worm gear and gear segment are usually accommodated within a housing or escutcheon with a shaft of the worm gear extending outward through the housing to mateably engage a handle or crank. The shaft is typically splined to achieve rotation without slipping when the handle crank is attached. When the crank is turned, the worm gear causes the gear segment and actuator arm to rotate which causes the sash to pivot on its hinges between open and closed positions.

One issue with this type of design is the limited amount of force or thrust that the operator assembly is capable of withstanding. This limited durability is especially evident under adverse environmental conditions such as high winds acting on an opened sash, which causes undue stress and strain on the operator assembly. Additionally, thrust forces associated with opening a partially blocked sash, or a sash that for other reasons remains reluctant to open, are amplified and present undue stress on the housing and worm gear drive that can cause breakage or undue degradation over a short period of time.

A second issue with this type of design is the inability to make adjustments to the operator assembly, and particularly the operator assembly actuator arm, during or after installation. A design that lends itself to adjustment during assembly would greatly benefit the manufacturer, and make for a more reliable operation since acute adjustments may be made in-situ, which may account for dimensional tolerance discrepancies upon installation.

In U.S. Pat. No. 4,860,493, issued to Lense on Aug. 29, 1989, titled "Non-Backdriving Actuator For Opening and Closing a Window Sash," a non-back driven actuator is taught. The window shaft is automatically locked against rotation if a backdriving force is applied to the actuator from outside the premises. This prevents an open sash from being buffeted by wind and from being pulled open further by a potential intruder. The sash is supported for movement between its closed and open positions in a conventional manner. There are no additional components to compensate for the added thrust.

In U.S. Pat. No. 5,765,308 issued to Anderson, et al. on Jun. 16, 1998, titled "Window Operator," a window operator is taught that includes a cover secured to the base with a support surface having a hole therethrough defining an internal shoulder. The second support surface mates with another support surface. A post extends from the cover and through the aperture in the base when the operator is assembled. An arm is pivotally secured to the post and attachable to the sash to control the movement of the sash between open and closed positions. A worm drive assembly driveably engages the arm and has a worm shaft and a worm shoulder disposed on the worm shaft. The worm is directly supported by the support surfaces at one end and the worm shoulder engages the internal shoulder as the worm shaft protrudes from the hole. Importantly, unlike the present invention, this design does not limit thrust force or include an adjustment screw bearing cooperating with an inner threaded post.

In U.S. Pat. No. 7,278,335, issued to Zhang on Oct. 9, 2007, titled "Adjustable Threaded Bearing and Bearing Assembly for a Window Operator and Feature," a bearing assembly is taught for use with a window operator having a housing with an operator slot and a bore through which is threaded an adjustable bearing. The bearing contains a smooth end with two walls of differing diameter that form shoulders. The shoulders fit substantially against an inner and outer surface of the slot to rotatably position and secure an operator arm therein.

When the operator arm is inserted into the slot of the housing a gap forms between the operator arm and the upper part of the slot section. To minimize or alleviate this gap, an adjustable bearing is placed into the bore of the housing. The adjustable bearing has a generally cylindrical body with an internal end and an external threaded end. The threaded bearing is disposed through the bore and hole to mount rotatably the operator arm within housing. An external threaded end threads into an internal thread of the bore and inner end fits inside the bore extending into the top part, closed end.

The operator arm moves around the bearing, and the connector end, attached directly or indirectly to a window sash, functions for opening and closing windows. The movement of the operator arm is achieved by the close association of movement between the operator arm and the worm gear. Although there is a type of adjustment to the arm, this adjustment is not designed to be made after installation, and there is no attempt in this prior art to provide an adjustment screw with bottom bearing surface made of a hardened material to support the thrust loads on the worm gear downward.

SUMMARY OF THE INVENTION

Bearing in mind the problems and deficiencies of the prior art, it is therefore an object of the present invention to provide an operator assembly for a casement window capable of withstanding significantly more force or thrust on the assembly during operation under adverse conditions.

It is another object of the present invention to provide an operator assembly for a casement window capable of making adjustments during or after installation.

The above and other objects, which will be apparent to those skilled in the art, are achieved in the present invention which is directed to a casement window operator assembly comprising: a housing base engageable with a cover plate for mounting a worm gear drive assembly; the worm gear drive assembly including: at least one knob at a top end for attachment to a handle crank or electric motor, the top end extending upwards from a shoulder portion of the worm gear drive; a threaded portion for rotational engagement with an actuator arm, the threaded portion extending downwards from the shoulder portion; and a bottom portion for translating thrust forces to the housing base; a top thrust bearing plate having a cavity for receiving the top end of the worm gear drive assembly, the top thrust bearing plate cavity having a smaller diameter than the shoulder portion of the worm gear drive for securing the worm gear drive top end from axial movement upwards, while prohibiting rotational movement of the worm gear drive from interacting with the cover plate or the housing base, the top thrust bearing plate including a non-rotational base portion for attachment to the cover plate or the housing base or both, the non-rotational base portion entrapped by the cover plate or the housing base or both to prohibit rotation when subjected to rotational forces from the worm gear drive.

The casement window operator assembly may further include a non-rotatable bottom thrust bearing plate in mechanical communication with the worm gear drive bottom portion, the bottom thrust bearing plate secured by the housing base without rotating when subjected to rotational forces from the worm gear drive.

A vertical adjustment assembly for the actuator arm is included, the vertical adjustment assembly comprises: an adjustment screw and bearing disc subassembly, the subassembly rotatable within a cavity of the housing base; a cylindrical bearing having an outer diameter approximately equal to, and insertable within, an aperture within an attachment portion of the actuator arm; and a threaded post within the cover plate for receiving the adjustment screw.

The cover plate or the housing base or both includes a formed cavity for receiving the top thrust bearing plate, securing the top thrust bearing plate in place during rotation of the worm gear drive.

The housing base includes a formed cavity for receiving the bottom thrust bearing plate, securing the bottom thrust bearing plate in place during rotation of the worm gear drive.

The adjustment screw may be integral with the bearing disc.

In a second aspect, the present invention is directed to a casement window operator assembly comprising: a housing base engageable with a cover plate for mounting a worm gear drive assembly; the worm gear drive assembly including: at least one knob at a top end for attachment to a handle crank or electric motor, the top end extending from a shoulder portion of the worm gear drive; a threaded portion for rotational engagement with an actuator arm, the threaded portion extending downwards from the shoulder portion; and a bottom portion having a predominantly flat bottom surface for translating thrust forces to the housing base; a top thrust bearing plate having a circular cavity for receiving the top end of the worm gear drive assembly, the top thrust bearing plate circular cavity having a smaller diameter than the shoulder portion of the worm gear drive for securing the worm gear drive top end from axial movement upwards, while prohibiting rotational movement of the worm gear drive from interacting with the cover plate or the housing base, the top thrust bearing plate including a non-circular base portion for attachment to the cover plate or the housing base, the non-circular base portion entrapped by the cover plate or the housing base to prohibit rotation when subjected to rotational forces from the worm gear drive; a bottom thrust bearing plate in mechanical contact with the worm gear drive bottom portion, the bottom thrust bearing plate having a non-circular outer profile for attachment to the housing base, the non-circular outer profile held by the housing base without rotation when subjected to rotational forces from the worm gear drive; and a vertical adjustment assembly for the actuator arm, the vertical adjustment assembly including: an adjustment screw and bearing disc, the bearing disc having a knurled surface to facilitate rotation within a cavity of the housing base; a cylindrical bearing having an outer diameter approximately equal to, and insertable within, an aperture within an attachment portion of the actuator arm; and a threaded post within the cover plate for receiving the adjustment screw.

In this second aspect, the cover plate or the housing base or both includes a formed cavity for receiving the top thrust bearing plate, securing the top thrust bearing plate in place during rotation of the worm gear drive; and the housing base includes a formed cavity for receiving the bottom thrust bearing plate, securing the bottom thrust bearing plate in place during rotation of the worm gear drive.

In a third aspect, the present invention is directed to a method of adjusting a casement window operator assembly during or after installation, the method including rotating a vertical adjustment assembly to adjust the vertical placement of an actuator arm of the casement window operator assembly.

The method further includes a vertical adjustment assembly comprising: an adjustment screw and bearing disc, the bearing disc having a knurled surface to facilitate rotation within a cavity of a housing base; a cylindrical bearing having an outer diameter approximately equal to, and insertable within, an aperture within an attachment portion of the actuator arm; and a threaded post within the cover plate for receiving the adjustment screw; such that the rotating of the vertical adjustment assembly includes contacting the knurled surface of the bearing disc and turning the bearing disc about a center axis, thereby increasing or decreasing the distance of the bearing disc from the threaded post.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-9 of the drawings in which like numerals refer to like features of the invention.

Figure 1:
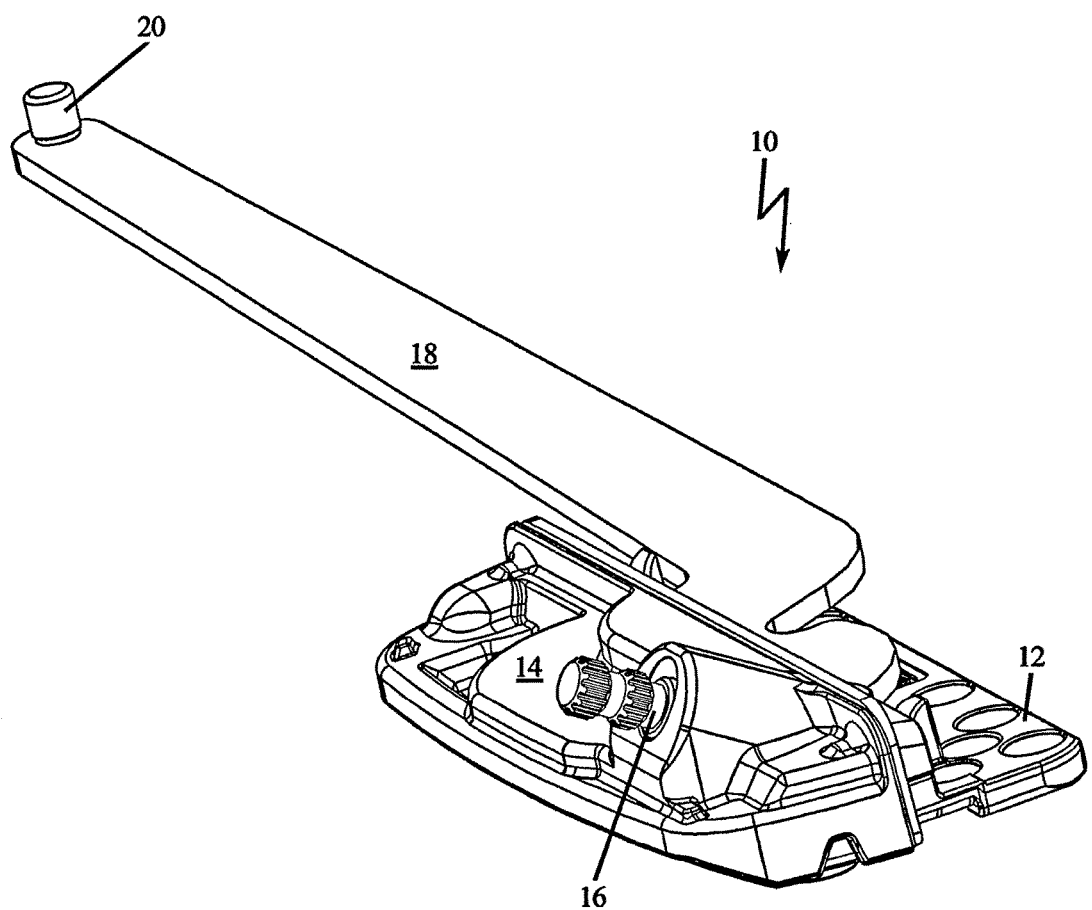
FIG. 1 depicts a casement window operator assembly according to the present invention.

FIG. 1 depicts a casement window operator assembly 10 according to the present invention. The basic elements of operator assembly 10 are a housing base 12 and a housing cover plate 14, which enclose a worm drive assembly 16 that drives a partially enclosed actuator arm 18. Actuator arm 18 works in conjunction with a bar hinge that extends and retracts a sash (not shown). The bar hinge is able to be fitted to either the top or bottom of the window, though generally it will be positioned at the bottom of the window. The window operator assembly 10 is mounted to the frame of the window.

Actuator arm 18 is pivotally coupled to housing base 12 via a pivot or bearing. The other end of actuator arm 18 is pivotally coupled by a pivot or bearing 20 to a sash mounting plate (not shown). This sash mounting plate is, in use, mounted to the top or bottom of the sash though generally it will be mounted to the bottom sill.

Housing base 12 is fastened in a conventional manner to the bottom the window frame. In a preferred embodiment of the present invention, housing base 12 is fastened to the frame section by suitable mechanical fasteners. Housing base 12 generally has a profiled end (that is the end opposite to that to which actuator arm 18 is coupled) which ensures that the casement window operator assembly is correctly located and disposed.

Figure 2:
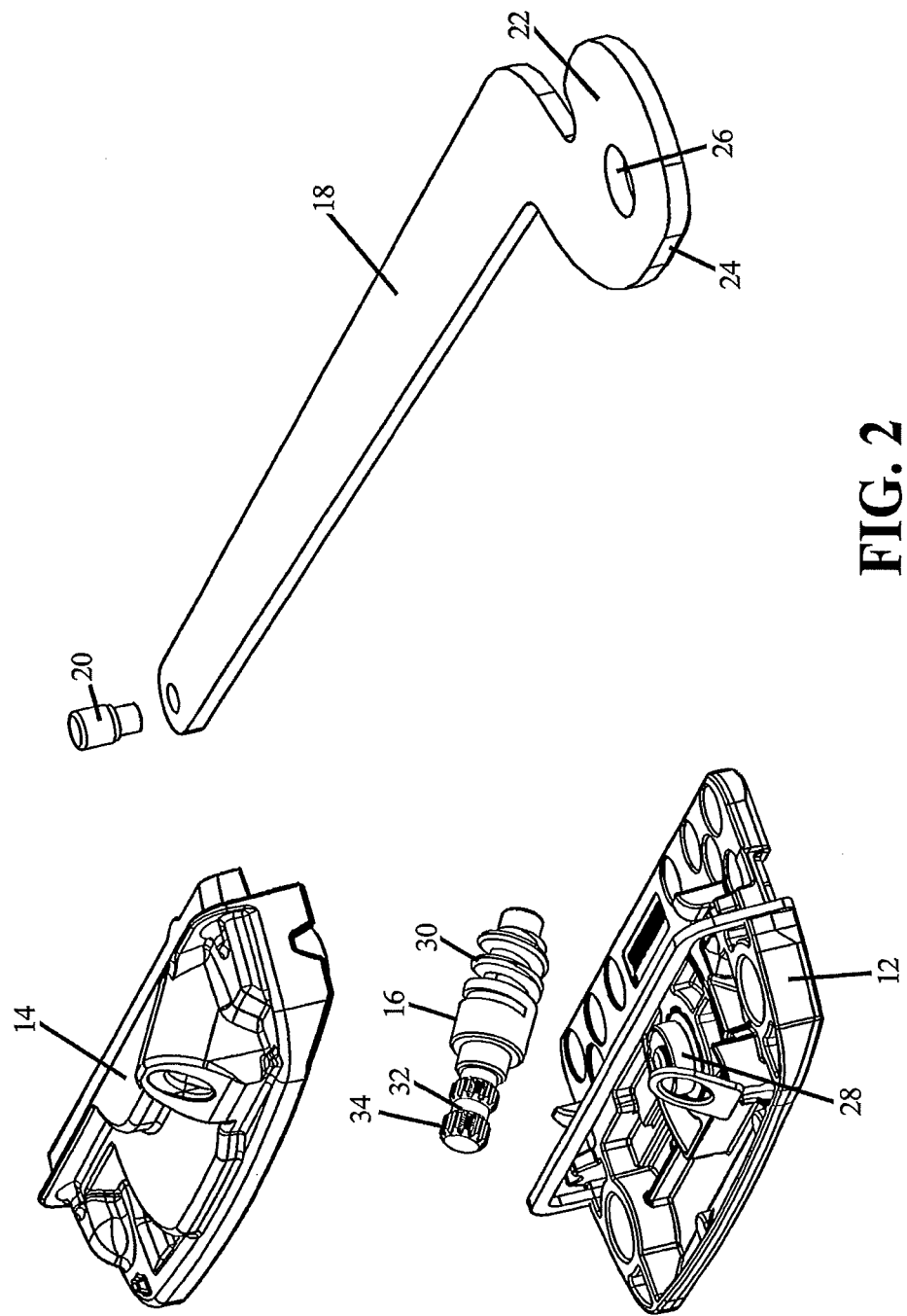
FIG. 2 depicts an exploded view of the casement window operator assembly of FIG. 1.

FIG. 2 depicts an exploded view of the casement window operator assembly 10 according to the present invention. Actuator arm 18 generally includes gear teeth located at the edge 24 of attachment portion 22. Gear teeth interact with the screw portion 30 of worm gear drive 16. Attachment portion 22 of actuator arm 18 includes an aperture 26 for rotatably engaging with a pivot assembly 28. A crank is mounted to crank portion 32 of worm gear drive 16; crank portion 32 including splines 34 for a hand crank or electric motor attachment without slippage. Rotation of the worm gear drive 16 causes the worm gear screw portion to rotate.

Figure 3:
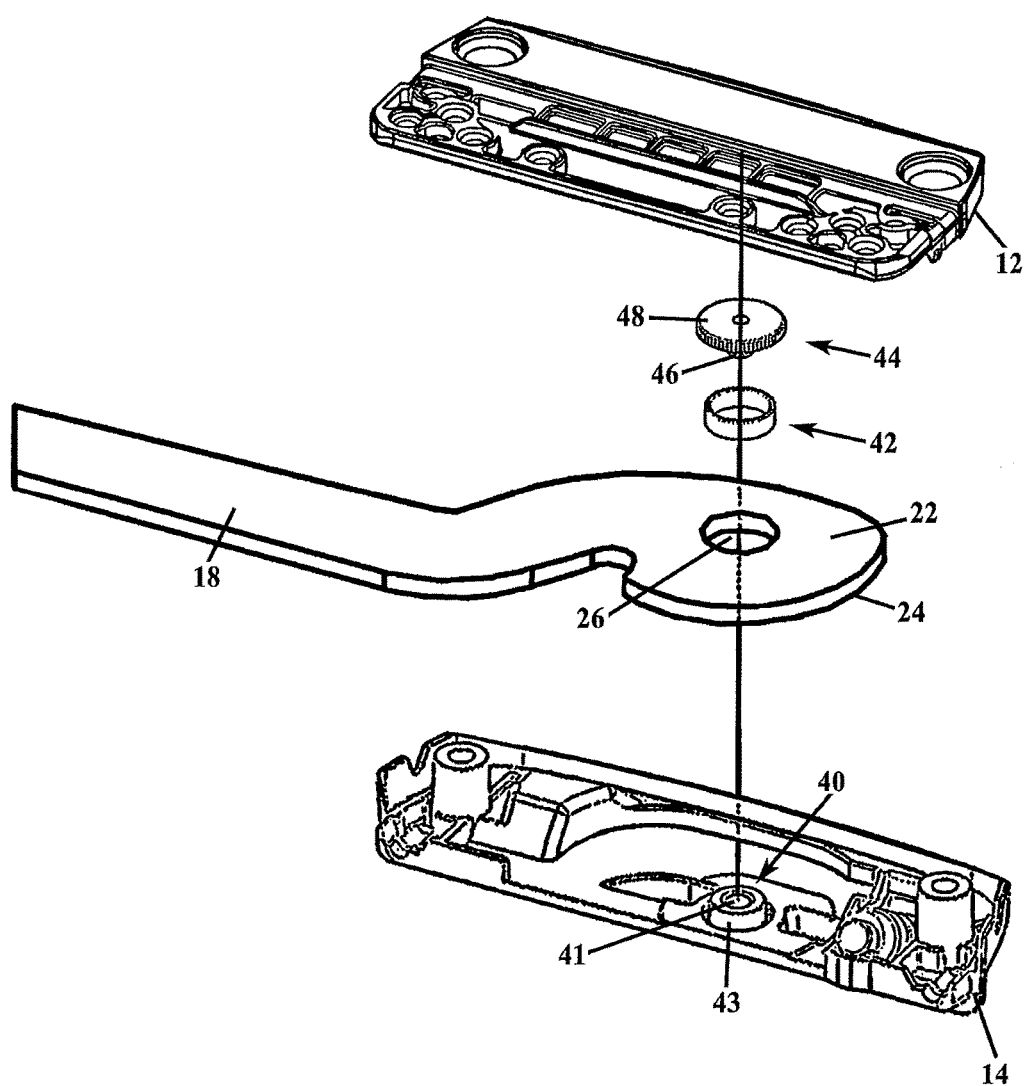
FIG. 3 depicts a bottom-side up exploded view of a portion of the casement window operator assembly delineating the adjustment screw and bearing assembly, along with the actuator arm and the threaded post within the housing base.

FIG. 3 depicts a bottom-side up exploded view of a portion of the casement window operator assembly, delineating the adjustment screw and bearing disc assembly 44, along with actuator arm 18, and the threaded post 40 within cover plate 14.

Pivot assembly 28 includes an adjustment screw and bearing disc 44 and cylindrical bearing 42, and rotatably secures actuator arm 18 in position within housing base 12. A threaded inside post 40 attached to, or preferably formed integrally with, cover plate 14 receives the threaded portion 46 of adjustment screw and bearing disc assembly 44. The adjustment screw 46 and attached bearing disc 48 are preferably integral with one another. Cylindrical bearing 42 slidably fits within aperture 26 of attachment portion 22 of actuator arm 18. The rotation of adjustment screw and bearing disc assembly 44 vertically adjusts the height of actuator arm 18; an adjustment that may be made after installation. Threaded inside post 40 includes a threaded cavity 41 with a cylindrical sidewall 43 for slidably mating with actuator arm attachment portion 22.

Figure 4:
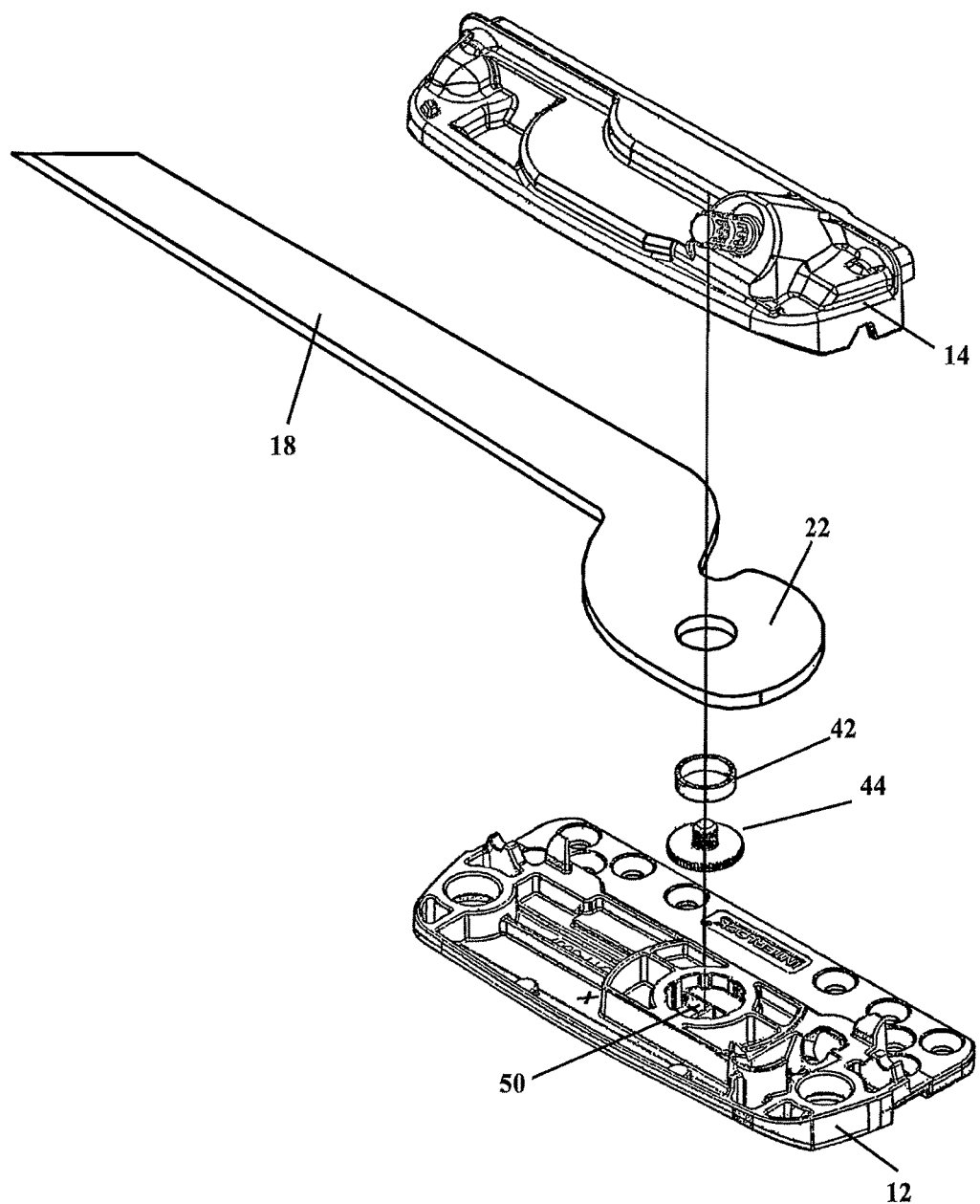
FIG. 4 is topside exploded view of the rotational mechanism for the actuator arm, which includes the preferably one-piece adjustment screw and bearing disc, a separate cylindrical bearing, and a receiving cavity formed within housing base.

FIG. 4 is a topside exploded view of the rotational mechanism for actuator arm 18, which includes the preferably one-piece adjustment screw and bearing disc 44, a separate cylindrical bearing 42, and receiving cavity 50 formed within housing base 12. Adjustment screw and bearing assembly 44 allow for variable movement in the vertical direction for the actuator arm assembly relative to housing base 12 and cover plate 14. The bearing disc includes a knurled outer surface to facilitate grasping during rotation. This adjustment provides a unique capability for an installer to modify in-situ the vertical placement of the actuator arm relative to its housing.

The bearing disc 48 also provides extra protection against thrust forces on the actuator arm. It presents a hard, metallic shield to the underlying housing base 12, and will not present rotational movement to the housing base when actuator arm 18 is in rotation.

Figure 5:
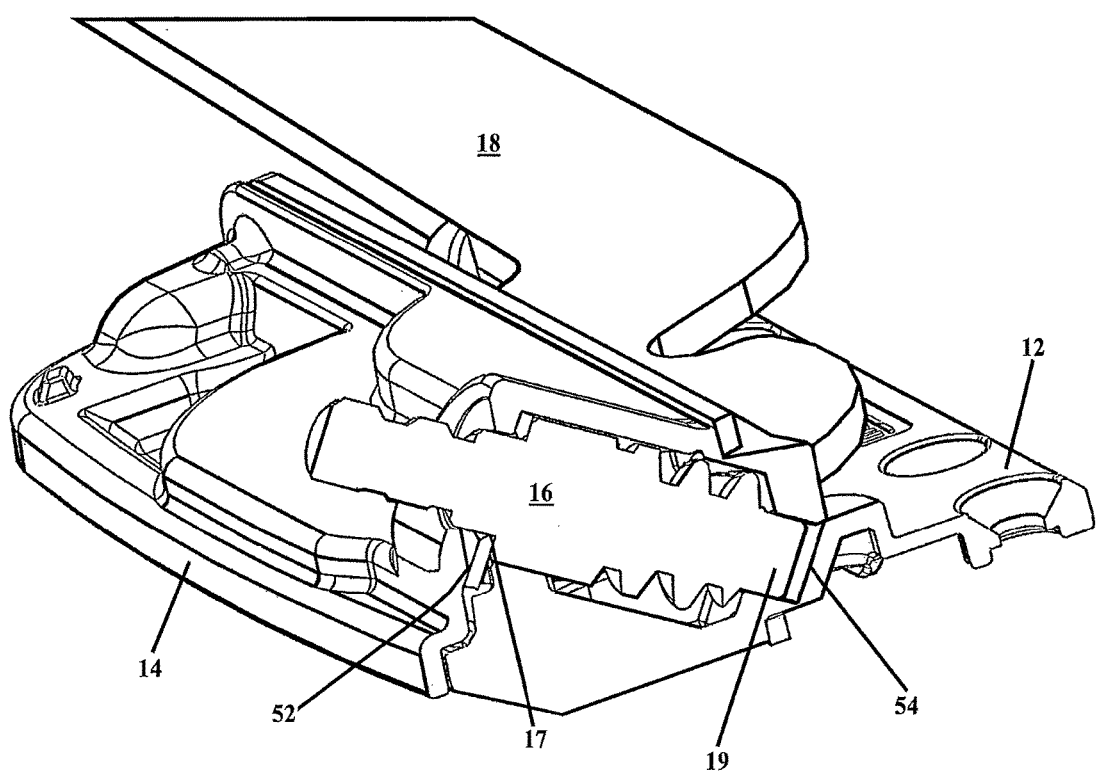
FIG. 5 depicts a cross-sectional view of the casement window operator assembly of the present invention delineating the top thrust and side load bearing as well as the bottom thrust bearing located at each end of the worm gear drive.

Pursuant to the present invention, worm gear drive assembly 16 shown in FIG. 5 is supported by additional bearing surfaces located at the top and bottom ends of the drive assembly, which are assembled prior to the housing base and cover plate being assembled together. A bottom bearing 54 is introduced, made of a hardened steel plate to support the thrust loads on the worm gear that are directed axially downward. At the top of the worm gear drive assembly a top thrust and side load bearing 52 is added to absorb the thrust loads directed axially upward, but also the side loads that are produced in a casement helical gear system. It has been determined that this development adds 25% or more load and cycle capability when compared to a similar system without these thrust bearings.

FIG. 5 depicts a cross-sectional view of the casement window operator assembly 10 of the present invention delineating the top thrust and side load bearing 52 as well as the bottom thrust bearing 54 located at each end of worm gear drive 16. Top thrust bearing 52 is located at a shoulder portion 17 of worm gear drive 16, and allows for thrust support without inhibiting rotational movement of the worm gear drive. Bottom thrust bearing 54 is located at the end 19 of worm gear drive 16, and provides resistance to axial downward forces by the worm gear drive during rotation and when the sash is unexpectedly subject to increase torque, such as when an opened sash is exposed to high winds. Bottom thrust bearing 54 is preferably made of a hardened steel plate to support the axially downward thrusts on the worm gear drive.

Figure 6:
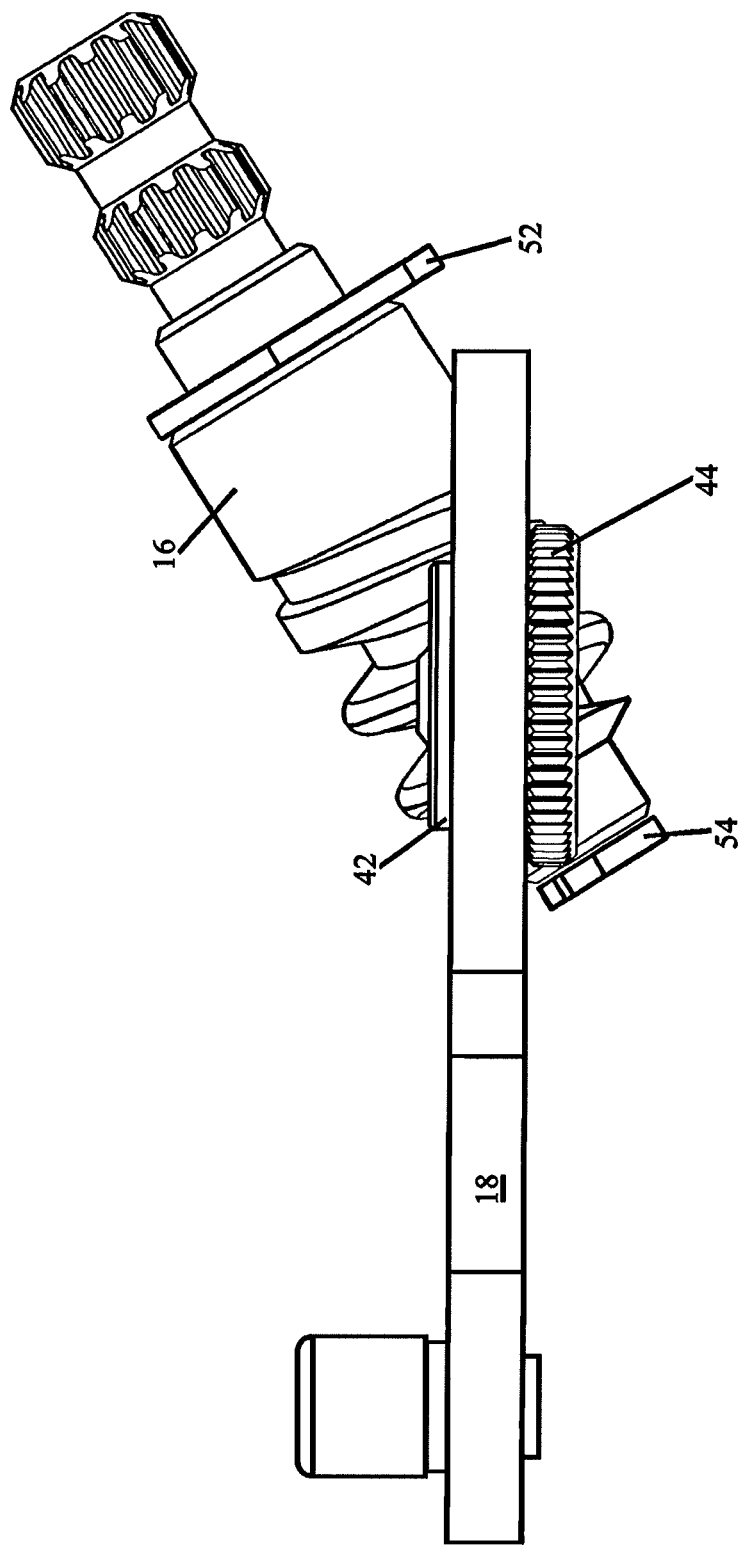
FIG. 6 depicts a side view of a partial casement window operator assembly showing the relative placement of the key components of the present invention.

FIG. 6 depicts a side view of a partial casement window operator assembly showing the relative placement of the key components of the present invention. The housing casing 12 and cover plate 14 have been removed for clarity. Worm gear drive 16 is angled in relation to the gear tooth portion of actuator arm 18 for rotational contact. Thrust bearing plates 52, 54 are shown at each end of worm gear drive 16 to absorb axial thrust forces on the worm gear. Adjustment screw and bearing disc assembly 44 are depicted in position to provide attachment support for actuator arm 18 as well as vertical adjustment of the arm after installation.

Figure 7:
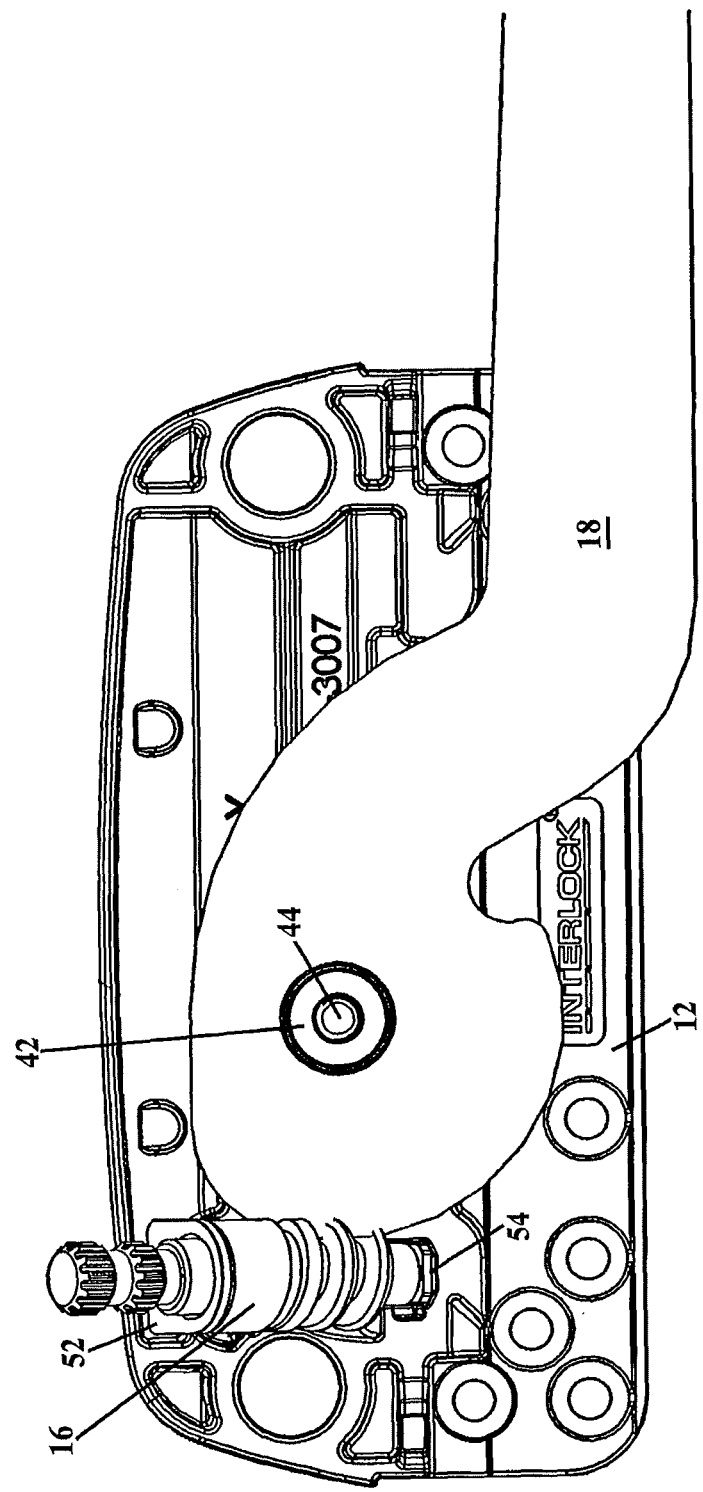
FIG. 7 is a downward perspective view of the casement window operator assembly of the present invention with the cover plate removed, depicting the interaction between the worm gear drive and the gear tooth portion of the actuator arm.

FIG. 7 is a downward perspective view of the casement window operator assembly of the present invention with the cover plate removed, depicting the interaction between worm gear drive 16 and the gear tooth portion of actuator arm 18. Adjustment screw and bearing disc assembly 44 is shown in contact with bearing 42 within the actuator arm aperture.

Figure 8:
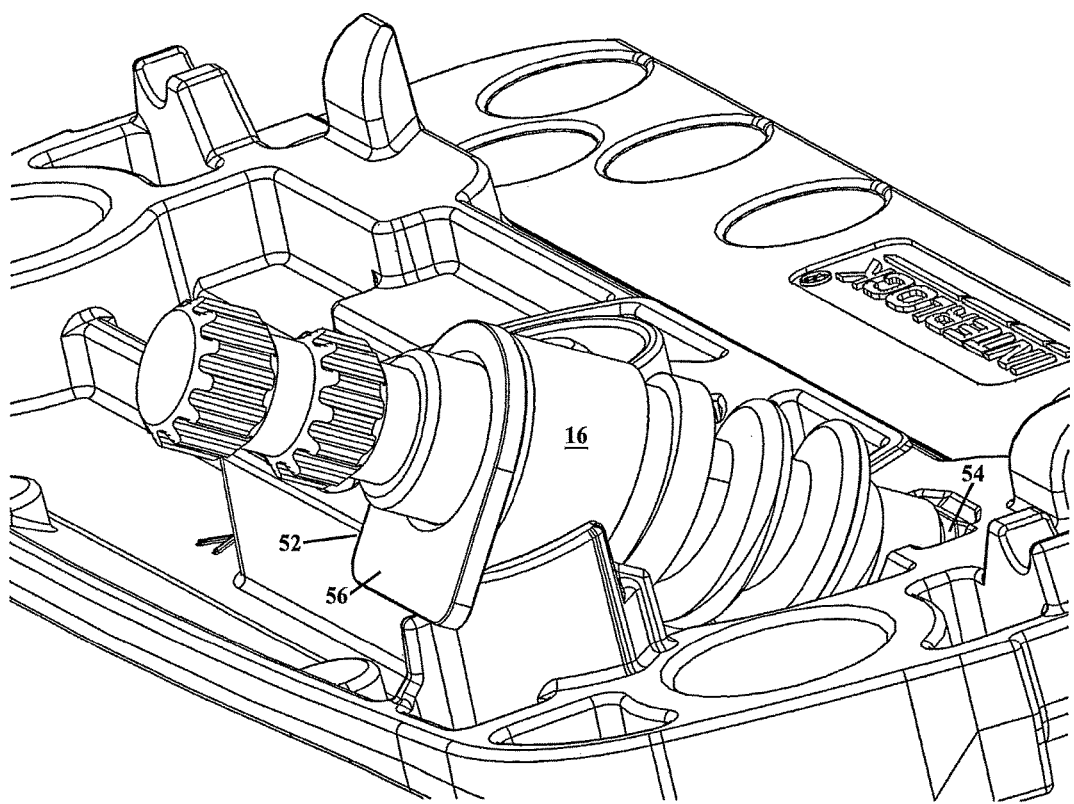
FIG. 8 is an exploded view of the worm gear drive top thrust bearing 52 of the present invention.

FIG. 8 is an exploded view of the worm gear drive top thrust bearing 52 of the present invention. As shown, thrust bearing 52 is not a circular washer-like component; rather, it has a non-rotational base portion 56 that is preferably not circular, and more preferably has straight edges, rectangular in nature, for immovable attachment to the cover plate, housing base, or both. This base portion 56 ensures that thrust bearing 52, which is in mechanical communication with worm gear drive 16, does not rotate when worm gear drive 16 is turning. In this manner, cover plate and/or housing base is not in direct contact with or subjected to rotational movement of the worm gear drive. By removing the rubbing and spinning contact of the worm gear drive on the typically zinc housing and cover, the housing segment that holds the upper portion of worm gear drive 16 is not degraded or weakened by this rotational wear over time. Bottom thrust bearing 54 is preferably a non-rotational plate for this same reason. By eliminating rotation of the bearing plates during worm gear drive rotation, the thrust bearing plates protect the housing base and cover plate from any unwanted degradation due to repeated rotational wear under thrust loads.

Figure 9:
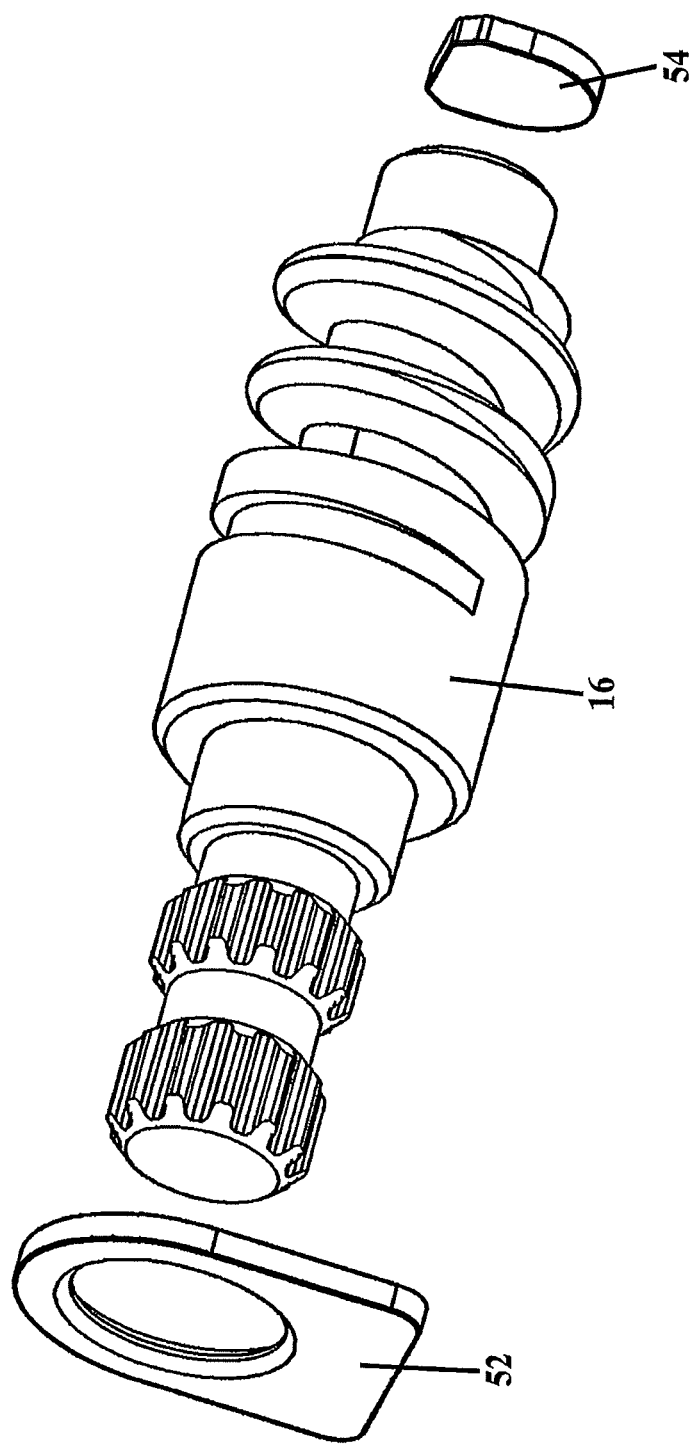
FIG. 9 is an exploded view of the worm gear drive of the present invention with top and bottom thrust bearings depicted.

FIG. 9 is an exploded view of the worm gear drive 16 of the present invention with its top and bottom thrust bearings 52, 54 shown in axial relation. From this perspective, it is clear that the thrust bearings are not circular, and once secured in their respective housing base and cover plate will not rotate when the worm gear drive is rotated.

The present invention is further directed to a method of vertical adjustment of the actuator arm by the rotation of the adjustment screw and bearing disc, moving the assembly to or away from the threaded post on the cover plate. This adjustment is performed by having a user rotate the knurled surface of the bearing disc, which subsequently rotates the adjustment screw, adjusting the vertical position of the actuator arm.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A casement window operator assembly comprising:
    a housing base engageable with a cover plate for mounting a worm gear drive assembly;
    said worm gear drive assembly including:
    at least one knob at a top end for attachment to a handle crank or electric motor, said top end extending upwards from a shoulder portion of said worm gear drive;
    a threaded portion for rotational engagement with an actuator arm, said threaded portion extending downwards from said shoulder portion; and
    a bottom portion for translating thrust forces to said housing base;
    a top thrust bearing plate attachable to one or both of the cover plate and housing base, the top thrust bearing plate having a cavity for receiving said top end of said worm gear drive assembly, said top thrust bearing plate cavity having a smaller diameter than said shoulder portion of said worm gear drive for securing said worm gear drive top end from axial movement upwards, while prohibiting rotational movement of said worm gear drive from interacting with said cover plate or said housing base, said top thrust bearing plate including a non-rotational base portion for attachment to said cover plate or said housing base or both, said non-rotational base portion entrapped by said cover plate or said housing base or both to prohibit rotation when subjected to rotational forces from said worm gear drive; and
    a non-rotatable bottom thrust bearing plate in mechanical communication with said worm gear drive bottom portion, said bottom thrust bearing plate disposed between said worm gear drive bottom portion and said housing base to prohibit direct contact between said worm gear drive and said housing base during rotational movement of said worm gear drive, said bottom thrust bearing plate secured by said housing base without rotating when subjected to rotational forces from said worm gear drive.

2. A casement window operator assembly comprising:
    a housing base engageable with a cover plate for mounting a worm gear drive assembly;

said worm gear drive assembly including:
at least one knob at a top end for attachment to a handle crank or electric motor, said top end extending upwards from a shoulder portion of said worm gear drive;
a threaded portion for rotational engagement with an actuator arm, said threaded portion extending downwards from said shoulder portion; and
a bottom portion for translating thrust forces to said housing base;
a top thrust bearing plate attachable to one or both of the cover plate and housing base, the top thrust bearing plate having a cavity for receiving said top end of said worm gear drive assembly, said top thrust bearing plate cavity having a smaller diameter than said shoulder portion of said worm gear drive for securing said worm gear drive top end from axial movement upwards, while prohibiting rotational movement of said worm gear drive from interacting with said cover plate or said housing base, said top thrust bearing plate including a non-rotational base portion for attachment to said cover plate or said housing base or both, said non-rotational base portion entrapped by said cover plate or said housing base or both to prohibit rotation when subjected to rotational forces from said worm gear drive;
a non-rotatable bottom thrust bearing plate in mechanical communication with said worm gear drive bottom portion, said bottom thrust bearing plate disposed between said worm gear drive bottom portion and said housing base to prohibit direct contact between said worm gear drive and said housing base during rotational movement of said worm gear drive, said bottom thrust bearing plate secured by said housing base without rotating when subjected to rotational forces from said worm gear drive; and
a vertical adjustment assembly for said actuator arm, said vertical adjustment assembly including:
an adjustment screw and bearing disc subassembly, said subassembly receivable within a cavity of said housing base;
a cylindrical bearing having an outer diameter approximately equal to, and insertable within, an aperture within an attachment portion of said actuator arm; and
a threaded post within said cover plate for threadably receiving said adjustment screw, said threaded post slidably matable within said aperture within said attachment portion of said actuator arm.

3. The casement window operator assembly of claim 2 wherein said cover plate or said housing base or both includes a formed cavity for receiving said top thrust bearing plate, securing said top thrust bearing plate in place during rotation of said worm gear drive.

4. The casement window operator assembly of claim 2 wherein said housing base includes a formed cavity for receiving said bottom thrust bearing plate, securing said bottom thrust bearing plate in place during rotation of said worm gear drive.

5. The casement window operator assembly of claim 2 wherein said adjustment screw is integral with said bearing disc.

6. The casement window operator assembly of claim 2 wherein said threaded post is attached to or integral with said cover plate.

7. The casement window operator assembly of claim 2 wherein said threaded post includes a cylindrical outer wall for insertion within said aperture within said attachment portion of said actuator arm.

8. The casement window operator assembly of claim 2 wherein said subassembly has a knurled surface to restrict rotation within said housing base cavity.

9. The casement window operator assembly of claim 2 wherein said bottom thrust bearing plate has a non-circular outer profile for attachment to said housing base, said non-circular outer profile held by said housing base without rotation when subjected to rotational forces from said worm gear drive.

10. The casement window operator assembly of claim 2 wherein said worm gear drive assembly bottom portion has a predominantly flat bottom surface for translating thrust forces to said housing base.

11. A casement window operator assembly comprising:
a housing base engageable with a cover plate for mounting a worm gear drive assembly;
said worm gear drive assembly including:
at least one knob at a top end for attachment to a handle crank or electric motor, said top end extending from a shoulder portion of said worm gear drive;
a threaded portion for rotational engagement with an actuator arm, said threaded portion extending downwards from said shoulder portion; and
a bottom portion having a predominantly flat bottom surface for translating thrust forces to said housing base;
a top thrust bearing plate having a circular cavity for receiving said top end of said worm gear drive assembly, said top thrust bearing plate circular cavity having a smaller diameter than said shoulder portion of said worm gear drive for securing said worm gear drive top end from axial movement upwards, while prohibiting rotational movement of said worm gear drive from interacting with said cover plate or said housing base, said top thrust bearing plate including a non-circular base portion for attachment to said cover plate or said housing base, said non-circular base portion entrapped by said cover plate or said housing base to prohibit rotation when subjected to rotational forces from said worm gear drive;
a bottom thrust bearing plate in mechanical contact with said worm gear drive bottom portion, said bottom thrust bearing plate disposed between said worm gear drive bottom portion and said housing base to prohibit direct contact between said worm gear drive and said housing base during rotational movement of said worm gear drive, said bottom thrust bearing plate having a non-circular outer profile for attachment to said housing base, said non-circular outer profile held by said housing base without rotation when subjected to rotational forces from said worm gear drive; and
a vertical adjustment assembly for said actuator arm, said vertical adjustment assembly including:
an adjustment screw and bearing disc subassembly, said subassembly having a knurled surface to restrict rotation within a cavity of said housing base;
a cylindrical bearing having an outer diameter approximately equal to, and insertable within, an aperture within an attachment portion of said actuator arm; and
a threaded post within said cover plate for threadably receiving said adjustment screw, said threaded post slidably matable within said aperture within said attachment portion of said actuator arm.

12. The casement window operator assembly of claim 11 wherein said cover plate or said housing base or both includes a formed cavity for receiving said top thrust bearing plate, securing said top thrust bearing plate in place during rotation of said worm gear drive; and said housing base includes a formed cavity for receiving said bottom thrust bearing plate, securing said bottom thrust bearing plate in place during rotation of said worm gear drive.

13. The casement window operator assembly of claim 11 wherein said adjustment screw is integral with said bearing disc.

14. The casement window operator assembly of claim 11 wherein said threaded post is attached to or integral with said cover plate.

* * * * *